(12) United States Patent
Kwon et al.

(10) Patent No.: US 11,031,646 B2
(45) Date of Patent: Jun. 8, 2021

(54) CYLINDRICAL BATTERY CELL MANUFACTURING DEVICE COMPRISING SECONDARY CRIMPING MOLD

(71) Applicant: LG Chem, Ltd., Seoul (KR)

(72) Inventors: Tae Hyun Kwon, Daejeon (KR); Hae Jin Lim, Daejeon (KR); Hyeon Soo Sim, Daejeon (KR); Ha Young Heo, Daejeon (KR); Joo Hwan Sung, Daejeon (KR); Hyoung Kwon Kim, Daejeon (KR); Duk Hyun Ryu, Daejeon (KR)

(73) Assignee: LG Chem, Ltd.

( * ) Notice: Subject to any disclaimer, the term of this patent is extended or adjusted under 35 U.S.C. 154(b) by 192 days.

(21) Appl. No.: 16/086,711

(22) PCT Filed: Nov. 28, 2017

(86) PCT No.: PCT/KR2017/013669
§ 371 (c)(1),
(2) Date: Sep. 20, 2018

(87) PCT Pub. No.: WO2018/117457
PCT Pub. Date: Jun. 28, 2018

(65) Prior Publication Data
US 2019/0148683 A1  May 16, 2019

(30) Foreign Application Priority Data
Dec. 22, 2016  (KR) .......................... 10-2016-0176346

(51) Int. Cl.
*H01M 2/00* (2006.01)
*H01M 50/166* (2021.01)
(Continued)

(52) U.S. Cl.
CPC ......... *H01M 50/166* (2021.01); *H01M 6/005* (2013.01); *H01M 10/04* (2013.01);
(Continued)

(58) Field of Classification Search
CPC .. H01M 10/38; H01M 10/04; H01M 10/0404; H01M 2/04
See application file for complete search history.

(56) References Cited

U.S. PATENT DOCUMENTS

| 2004/0012229 | A1 | 1/2004 | Nakajima et al. |
| 2004/0121229 | A1* | 6/2004 | Kim .................. H01M 10/052 429/164 |

(Continued)

FOREIGN PATENT DOCUMENTS

| CN | 101176908 A | 5/2008 |
| CN | 102110790 A | 6/2011 |

(Continued)

OTHER PUBLICATIONS

Extended European Search Report for Application No. EP17882421 dated Feb. 18, 2019.

(Continued)

*Primary Examiner* — Cynthia H Kelly
*Assistant Examiner* — Monique M Wills
(74) *Attorney, Agent, or Firm* — Lerner, David, Littenberg, Krumholz & Mentlik, LLP

(57) ABSTRACT

The present disclosure provides a cylinder type battery cell manufacturing apparatus which is an apparatus configured to form a crimping portion on a cap assembly coupling portion of a cylinder type battery cell, the manufacturing apparatus including: a primary crimping mold configured to apply a primary pressure so that an open upper end portion of a cylinder type metal can forms an inclination inclined to a central axis of the metal can on a vertical section in a state (Continued)

in which a cap assembly is coupled to the open upper portion of the cylinder type metal can; and a secondary crimping mold configured to apply a secondary pressure to the open upper end portion in which the inclination is formed so that a flat section parallel to a lower surface of the metal can is formed in the crimping portion.

17 Claims, 5 Drawing Sheets

(51) Int. Cl.
    *H01M 10/04*      (2006.01)
    *H01M 10/38*      (2006.01)
    *H01M 6/00*      (2006.01)
    *H01M 50/147*      (2021.01)

(52) U.S. Cl.
    CPC ... *H01M 10/0404* (2013.01); *H01M 10/0422* (2013.01); *H01M 10/38* (2013.01); *H01M 50/147* (2021.01)

(56) References Cited

U.S. PATENT DOCUMENTS

| | | |
|---|---|---|
| 2010/0021812 A1 | 1/2010 | Kim et al. |
| 2010/0119935 A1 | 5/2010 | Kim et al. |
| 2011/0151294 A1 | 6/2011 | Kang et al. |
| 2012/0040239 A1 | 2/2012 | Takahashi et al. |
| 2012/0094169 A1* | 4/2012 | Kim .................... H01M 2/0285 429/164 |

FOREIGN PATENT DOCUMENTS

| | | |
|---|---|---|
| CN | 102376902 A | 3/2012 |
| JP | H101154453 A | 6/1989 |
| JP | 2010282824 A | 12/2010 |
| KR | 19980051246 U | 10/1998 |
| KR | 19980060840 | 10/1998 |
| KR | 100467698 B1 | 1/2005 |
| KR | 20080023372 A | 3/2008 |
| KR | 20080053534 A | 6/2008 |
| KR | 20080053538 A | 6/2008 |
| KR | 100948001 B1 | 3/2010 |
| KR | 1240717 B1 | 2/2013 |
| KR | 20130122051 A | 11/2013 |
| KR | 19980078956 | 11/2018 |

OTHER PUBLICATIONS

Search report from International Application No. PCT/KR2017/013669, dated Mar. 6, 2018.
Chinese Search Report for Application No. 201780026821.4, dated Jan. 18, 2021, pp. 1-3.

* cited by examiner

CYLINDRICAL BATTERY CELL MANUFACTURING DEVICE COMPRISING SECONDARY CRIMPING MOLD

CROSS-REFERENCE TO RELATED APPLICATIONS

This application is a national phase entry under 35 U.S.C. § 371 of International Application No. PCT/KR2017/013669 filed on Nov. 28, 2017, which claims priority to Korean Patent Application No. 10-2016-0176346 filed on Dec. 22, 2016, the disclosures of which are incorporated herein by reference.

TECHNICAL FIELD

The present disclosure relates to a cylinder type battery cell manufacturing apparatus including a secondary crimping mold.

BACKGROUND ART

Depletion of fossil fuel has brought about a great increase in the price of energy sources and increased interest in environmental pollution. Eco-friendly alternative energy sources are a necessity for the next generation. In this regard, a great deal of research into power production methods such as methods of producing nuclear energy, sunlight power, wind power, and tidal power is underway, and a power storage device for efficiently utilizing the produced energy is also attracting much attention.

As the technical development of and the demand on mobile devices increase, the demand on a battery as an energy source has rapidly increased, and a lot of research has been conducted on batteries that can meet various demands.

In terms of the shape of batteries, the demand for prismatic secondary batteries or pouch-shaped secondary batteries which are thin enough to be applied to products, such as mobile phones, is very high. However, in terms of the material for batteries, the demand for lithium secondary batteries, such as lithium ion batteries and lithium ion polymer batteries, exhibiting high energy density, discharge voltage, and output stability is very high.

Further, the secondary battery may be classified according to a structure of an electrode assembly having a structure in which a positive electrode, a negative electrode, and a separator interposed between the positive electrode and the negative electrode are laminated. Typical examples are a jelly-roll type (wound type) electrode assembly having a structure in which long sheet-like positive electrodes and negative electrodes are wound with a separator interposed therebetween, and a stack type (laminated type) electrode assembly in which a large number of positive electrodes and negative electrodes cut in units of a predetermined size are sequentially laminated with a separator interposed therebetween. Recently, in order to solve problems of the jelly-roll type electrode assembly and the stack type electrode assembly, as an electrode assembly having an advanced structure that is a mixed type of the jelly-roll type and the stack type, a stacked/folded type electrode assembly having a structure in which unit cells in which a predetermined unit of positive electrodes and negative electrodes are laminated with a separator interposed therebetween, are positioned on the separator, and are sequentially wound has been developed.

In particular, a cylinder type battery cell including a jelly-roll type electrode assembly can be easily manufactured and has a high energy density per unit weight.

FIG. 1 is a schematic view showing a structure of a cylinder type battery cell.

Referring to FIG. 1, a cylinder type battery cell 100 is manufactured by housing an electrode assembly 120 of a wound type structure into a cylinder type metal can 130, injecting an electrolyte into the metal can 130, and coupling a cap assembly 140 having an electrode terminal (for example, a positive electrode terminal; not shown) formed thereon at an open upper end of the metal can 130.

The electrode assembly 120 is manufactured by sequentially laminating a positive electrode 121, a negative electrode 122, and a separator 123, followed by winding into a rounded shape.

A cylinder type center pin 160 is inserted into a through-type winding core portion 150 formed at a center portion of the electrode assembly 120. The center pin 160 is generally made of a metal material to impart a predetermined strength thereto, and has a hollow cylinder type structure in which a plate material is bent into a round shape. The center pin 160 serves to fix and support the electrode assembly 120, and serves as a passage for discharging gases generated by internal reactions during charging, discharging, and operation of the electrode assembly 120.

A positive electrode terminal 141 is formed to protrude at an upper center portion of the cap assembly 140 and a negative electrode terminal is formed at a remaining portion of the metal can 130.

Here, in a case in which the cylinder type battery cell 100 is electrically connected to a plate type substrate such as a rigid flex substrate, the rigid flex substrate is bonded to an upper end of the cap assembly 140 by welding while being positioned at the upper end of the cap assembly 140, thereby being electrically connected to the cylinder type battery cell 100.

Here, the positive electrode terminal 141 formed at the upper center portion of the cap assembly 140 has a relatively large area facing the rigid flex substrate, so that the rigid flex substrate may be easily welded to the positive electrode terminal 141. On the other hand, the negative electrode terminal of the cylinder type battery cell 100 formed with a crimping portion 142, which is formed by inwardly bending an open upper end portion of the metal can 130 so that the cap assembly 140 is fixed at an outer periphery of the cap assembly 140, is bonded to the rigid flex substrate by welding while being faced to the rigid flex substrate.

However, the negative electrode terminal, that is, the crimping portion 142 bonded to the rigid flex substrate, has a relatively smaller area than the positive electrode terminal 141 and thus welding is not easy, thereby increasing a defect rate generated in a welding process.

Furthermore, a desired degree of welding strength may not be exhibited due to a small area of the welded structure, and thus a bonding state of the crimping portion 142 and the rigid flex substrate may not be stably maintained.

Therefore, there is a great need for technology that can fundamentally solve such problems.

DISCLOSURE

Technical Problem

The present disclosure is provided to solve the above-described problems of the related art and technical problems which have been identified in the past.

The inventors of the present application have conducted intense research and various experiments and have confirmed that, as will be described below, a wider area electrode terminal portion, which is formed by crimping an open upper portion of a metal can, may be formed by a secondary crimping mold by configuring a cylinder type battery cell manufacturing apparatus to include the secondary crimping mold to form a flat section on a crimping portion. Accordingly, easier welding may be possible when a substrate having a plate type structure such as a rigid flex substrate is electrically connected to an upper end of a cylinder type battery cell, thereby reducing a defect rate that may occur in a welding process and saving cost and time required for manufacturing a product. Further, as the welding area is widened, a better bonding force may be exhibited between the substrate and the battery cell, so that structural stability may be improved and reliability of an electrical connection may also be improved. Thus, the present disclosure has been completed.

Technical Solution

According to an aspect of the present disclosure, there is provided a cylinder type battery cell manufacturing apparatus which is an apparatus configured to form a crimping portion on a cap assembly coupling portion of a cylinder type battery cell, the manufacturing apparatus including: a primary crimping mold configured to apply a primary pressure so that an open upper end portion of a cylinder type metal can forms an inclination inclined to a central axis of the metal can on a vertical section in a state in which a cap assembly is coupled to the open upper portion of the cylinder type metal can; and a secondary crimping mold configured to apply a secondary pressure to the open upper end portion in which the inclination is formed so that a flat section parallel to a lower surface of the metal can is formed in the crimping portion.

Here, the manufacturing apparatus may have a structure in which a flat portion corresponding to the flat section is formed on a lower surface of the secondary crimping mold facing the open upper end portion of the metal can to form the flat section in the crimping portion.

Accordingly, a wider area electrode terminal portion, which is formed by crimping the open upper portion of the metal can, may be formed by the secondary crimping mold. Thus, easier welding may be possible when a substrate having a plate type structure such as a rigid flex substrate is electrically connected to an upper end of the cylinder type battery cell, thereby reducing a defect rate that may occur in the welding and saving cost and time required for manufacturing a product. Further, as the welding area is widened, a better bonding force may be exhibited between the substrate and the battery cell, so that structural stability may be improved and reliability of an electrical connection may also be improved.

In one specific example, the primary crimping mold may include: an inclination portion having an inclined structure in which the lower surface of the primary crimping mold, which faces the open upper end portion of the metal can, is inclined to the central axis of the metal can on the vertical section so that the open upper end portion of the metal can forms the inclination inclined to the central axis of the metal can on the vertical section; and an inclination blocking portion connected to the inclination portion, and having a structure parallel to the lower surface of the metal can to prevent the open upper end portion from being bent.

Accordingly, the open upper end portion of the metal can may be bent by the primary pressure applied by the primary crimping mold along the inclination portion of the primary crimping mold to form the inclination inclined inward, that is, toward the central axis direction of the metal can, in a state of facing the inclination portion of the lower surface of the primary crimping mold, and may be prevented from being further bent and inclined at the inclination blocking portion connected to the inclination portion, and thus the open upper end portion of the metal can may be more easily bent to an inside not to an outside of the metal can when the secondary pressure is applied by the secondary crimping mold.

Further, the inclination at which the open upper end portion is inclined by the primary crimping mold may have an angle of 10 to 80 degrees with respect to the central axis of the metal can.

When the inclination at which the open upper end portion is inclined by the primary crimping mold falls outside of the above-mentioned range and has an excessively small angle, effects expected by forming the inclination at the open upper end portion of the metal can by the primary crimping mold may not be sufficiently achieved. More specifically, since the open upper end portion is barely inclined to the central axis of the metal can on the vertical section in accordance with an application of the primary pressure by the primary crimping mold, the open upper end portion may not be stably deformed in a desired direction or length when the secondary pressure is applied by the secondary crimping mold.

On the other hand, when the inclination at which the open upper end portion is inclined by the primary crimping mold falls outside of the above-mentioned range and has an excessively great angle, the open upper end portion may have little to no deformation even when the secondary pressure by the secondary crimping mold is applied after the primary pressure is applied by the primary crimping mold, and thus effects expected by separately applying the primary pressure and the secondary pressure by the primary crimping mold and the secondary crimping mold may not be sufficiently achieved. More specifically, since the open upper end portion is excessively bent by the primary crimping mold without a flat portion, the flat section may not be sufficiently formed in the crimping portion even when the secondary pressure is applied by the secondary crimping mold.

Further, the secondary crimping mold may further include: an outer periphery supporting portion perpendicular to the flat portion and facing a crimped outer periphery of the cap assembly coupling portion; and a connection portion having a streamlined structure on a vertical section of the secondary crimping mold to connect the flat portion to the outer periphery supporting portion.

Accordingly, the secondary crimping mold may form the crimping portion in a state in which the outer periphery supporting portion stably supports the outer periphery of the cap assembly coupling portion, and the open upper end portion of the metal can may be more easily bent to an angle parallel to the lower surface of the metal can along the connection portion in a state in which the open upper end portion of the metal can faces the connection portion having the streamlined structure on the vertical section.

Here, the secondary crimping mold may further include an inclination forming portion, which is bent and extended from an end portion of the flat portion to the lower surface direction of the metal can, at one side end portion of the flat portion facing the outer periphery supporting portion on the vertical section, to further bend the open upper end portion toward the lower surface direction of the metal can.

Accordingly, since the open upper end portion of the metal can is further bent in the lower surface direction of the metal can after the flat section is formed, it is possible to prevent a defect in which the open upper end portion of the metal can, on which the flat section is formed, is bent back to an upward direction.

In one specific example, a length of the flat section of the crimping portion formed by the flat portion of the secondary crimping mold may have a size of 5% to 20% of a diameter of the metal can.

When the length of the flat section falls outside of the above-mentioned range and has an excessively small size, the length of the flat section is excessively small so that spaces in which the welding is to be performed may not be sufficiently provided. Accordingly, a defect rate that may occur in the welding process may be increased and a stable bonding force may not be exhibited at a portion in which the welding is performed, thereby deteriorating structural stability.

On the other hand, when the length of the flat section falls outside of the above-mentioned range and has an excessively great size, the open upper end portion of the metal can may be brought into contact with an electrode terminal formed at an upper center portion of the cap assembly, thereby causing a short circuit and deteriorating the performance of the battery cell.

Further, the secondary pressure applied by the secondary crimping mold may be 101% to 300% of the primary pressure applied by the primary crimping mold.

When the secondary pressure applied by the secondary crimping mold is less than 101% of the primary pressure applied by the primary crimping mold, it may not be easy to further bend the open upper end portion of the metal can to form the flat section in the crimping portion.

On the other hand, when the secondary pressure applied by the secondary crimping mold is greater than 300% of the primary pressure applied by the primary crimping mold, the secondary pressure becomes excessively great, and thus the deformation of the open upper end portion of the metal can may be difficult to be controlled, thereby increasing a defect rate of the product due to the excessive deformation in a process of forming the flat section in the crimping portion.

Meanwhile, the cap assembly may be coupled to the open upper portion of the metal can with a gasket surrounding the outer periphery of the cap assembly interposed therebetween.

Accordingly, the cap assembly may more stably maintain a sealed state with respect to the open upper portion of the metal can.

Here, the gasket may include a protruding portion, which protrudes relatively more compared to a remaining portion of the gasket excluding the protruding portion at an outer peripheral portion inside the gasket facing the upper surface of the cap assembly on a vertical section. The protruding portion may have a portion having a flat structure and facing the upper surface of the cap assembly to increase a contact area between the protruding portion and the upper surface of the cap assembly.

Accordingly, in a process of forming the flat section by bending the open upper end portion of the metal can, since the protruding portion faces the upper surface of the cap assembly on the vertical section and the portion of the protruding portion facing the upper surface of the cap assembly has a flat structure, the contact area between the gasket and the upper surface of the cap assembly is increased. Thus, a better sealing performance may be provided and the flat section formed by bending the open upper end portion of the metal can at the above-mentioned portion may be made more flat.

In such a case, an end portion of the gasket in which the protruding portion is located may protrude relatively more than the open upper end portion of the metal can at a position between the crimped open upper end portion of the metal can and the upper surface of the cap assembly, and at least a part of the crimped open upper end portion of the metal cab may be wrapped by the end portion of the gasket which is relatively more protruding.

That is, the open upper end portion of the metal can may be further bent in a direction of the end portion of the gasket, which protrudes relatively more, by the inclination forming portion of the secondary crimping mold and may be more closely attached to the gasket, and a part of the open upper end portion bent in the direction of the end portion of the gasket is wrapped by the end portion of the gasket, thereby providing a better sealing performance.

Further, the present disclosure provides a method of forming a crimping portion on a cap assembly coupling portion using the cylinder type battery cell manufacturing apparatus, and the method includes:

(a) forming an inwardly indented beading portion such that a cap assembly is seated in an open upper portion of a cylinder type metal can;

(b) seating the cap assembly in the open upper portion of the metal can;

(c) applying a primary pressure by a primary crimping mold located on the cap assembly such that an open upper end portion of the metal can forms an inclination inclined to a direction of a lower surface of the metal can on a vertical section; and (d) applying a secondary pressure to the open upper end portion in which the inclination is formed by the secondary crimping mold so that a flat section parallel to the lower surface of the metal can is formed in the crimping portion.

In such a case, the beading portion of process (a) may be formed at a portion spaced apart by a distance of 200% to 500% from the open upper end portion of the metal can on the basis of a length in a vertical section of the flat section formed in the crimping portion.

That is, the beading portion may be formed at a portion further spaced from the open upper end portion of the metal can as compared with a portion formed in a conventional cylinder type battery cell so as to provide a length for forming the flat section in the crimping portion.

When the beading portion is formed at a portion spaced apart by a distance of less than 200% from the open upper end portion of the metal can on the basis of the length in the vertical section of the flat section formed in the crimping portion, a sufficient length for forming the flat section may not be provided at a portion between the open upper end portion and the beading portion.

On the other hand, when the beading portion is formed at a portion spaced apart by a distance exceeding 500% from the open upper end portion on the basis of the length in the vertical section of the flat section formed in the crimping portion, the length of the flat section becomes excessively great and the crimped open upper end portion of the metal can may be brought into direct contact with an electrode terminal formed at an upper center portion of the cap assembly, thereby causing a short circuit.

Meanwhile, the cap assembly of process (b) may be seated in the open upper portion of the metal can in a state in which a gasket surrounding an outer periphery of the cap assembly is coupled to the cap assembly.

Accordingly, the cap assembly may more stably maintain a sealed state with respect to the open upper portion of the metal can.

In one specific example, the primary crimping mold may include: an inclination portion having an inclined structure in which the lower surface of the primary crimping mold, which faces the open upper end portion of the metal can, is inclined on the vertical section to a central axis of the metal can so that the open upper end portion of the metal can forms the inclination inclined on the vertical section to the central axis of the metal can; and an inclination blocking portion connected to the inclination portion and having a structure parallel to the lower surface of the metal can to prevent the open upper end portion from being bent.

Accordingly, the open upper end portion of the metal can may be bent by the primary pressure applied by the primary crimping mold along the inclination portion of the primary crimping mold to form the inclination inclined toward inward, that is, toward the central axis direction of the metal can, in a state of facing the inclination portion of the lower surface of the primary crimping mold, and may be prevented from being further bent and inclined at the inclination blocking portion connected to the inclination portion, and thus the open upper end portion of the metal can may be more easily bent to an inside not to an outside of the metal can when the secondary pressure is applied by the secondary crimping mold.

Further, a flat portion corresponding to the flat section may be formed on a lower surface of the secondary crimping mold facing the open upper end portion to form the flat section in the crimping portion.

Accordingly, a wider area electrode terminal portion, which is formed by crimping the open upper portion of the metal can, may be formed by the secondary crimping mold. Thus, easier welding may be possible when a substrate having a plate type structure such as a rigid flex substrate is electrically connected to an upper end of the cylinder type battery cell, thereby reducing a defect rate that may occur in the welding and saving cost and time required for manufacturing a product. Further, as the welding area is widened, a better bonding force may be exhibited between the substrate and the battery cell, so that structural stability may be improved and reliability of an electrical connection may also be improved.

On the other hand, the secondary pressure applied by the secondary crimping mold in process (d) may be in a range of 101% to 300% of the primary pressure applied by the primary crimping mold in process (c).

When the secondary pressure applied by the secondary crimping mold is less than 101% of the primary pressure applied by the primary crimping mold, it may not be easy to further bend the open upper end portion of the metal can to form the flat section in the crimping portion.

On the other hand, when the secondary pressure applied by the secondary crimping mold is greater than 300% of the primary pressure applied by the primary crimping mold, the secondary pressure becomes excessively great, and thus the deformation of the open upper end portion of the metal can may be difficult to be controlled, thereby increasing a defect rate of the product due to the excessive deformation in a process of forming the flat section in the crimping portion.

Since the remaining configuration of the cylinder type battery cell manufacturing apparatus except for the above structure or configuration is known in the art, a detailed description thereof will be omitted in this specification.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF THE PREFERRED EMBODIMENTS

Figure 1:
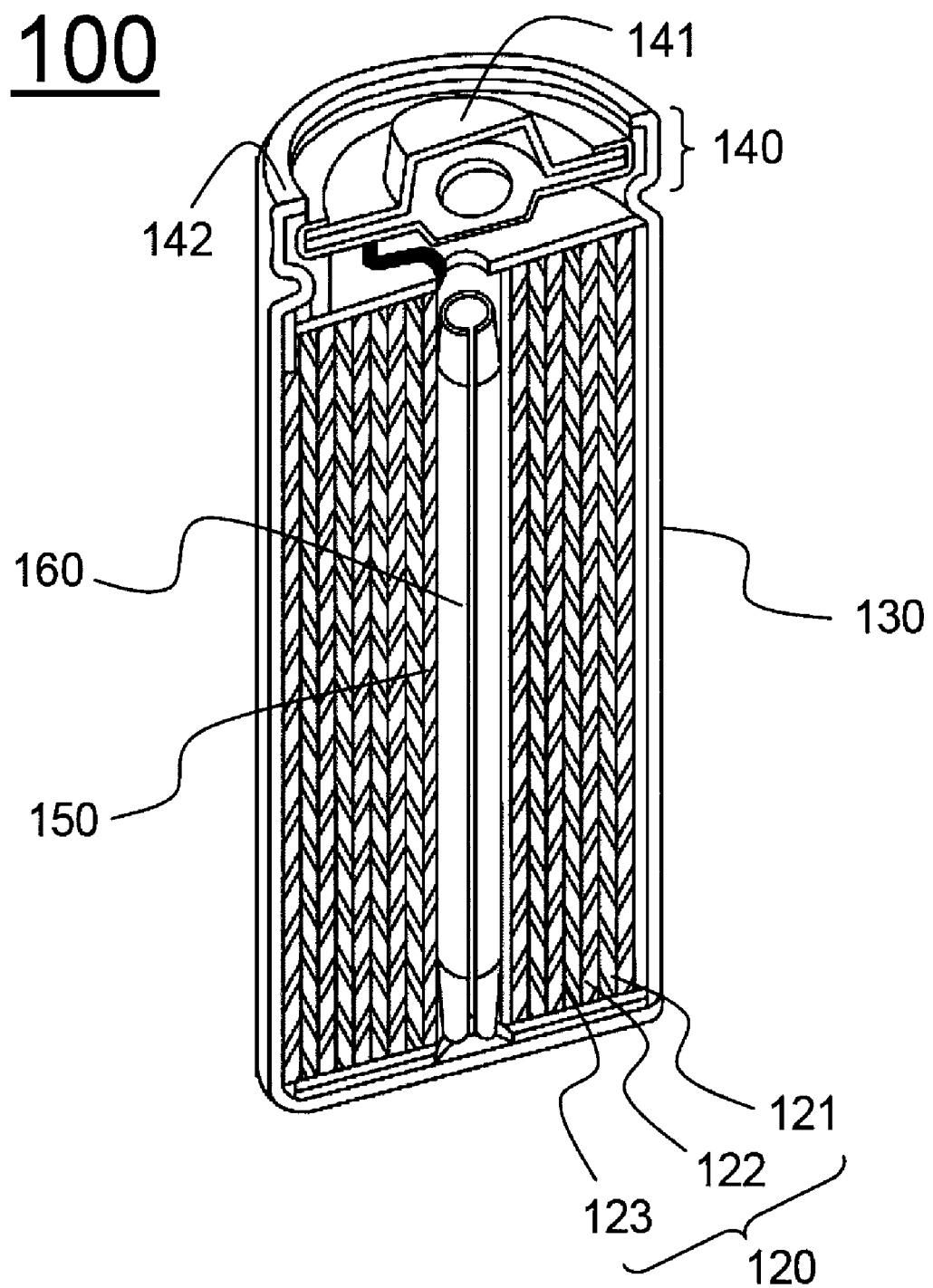
FIG. 1 is a schematic view showing a structure of a cylinder type battery cell.

Hereinafter, exemplary embodiments of the disclosure will be described in detail with reference to the drawings, and the scope of the present disclosure is not limited thereto.

FIGS. 2 to 5 are schematic views showing a process of forming a crimping portion using a cylinder type battery cell manufacturing apparatus according to one embodiment of the present disclosure.

Referring to FIGS. 2 to 5, first, in a cylinder type battery cell 200, a beading portion 212 indented inward is formed at an open upper portion of a metal can 210, and a cap assembly 220 is seated in the open upper portion of the metal can 210 by the beading portion 212.

An upper center portion 221 of the cap assembly 220 has a flat shape and is electrically connected to a positive electrode lead of an electrode assembly housed in the metal can 210 to form a positive electrode terminal.

A gasket 230 is disposed around an outer periphery of the cap assembly 220.

The gasket 230 includes a protruding portion 231, which protrudes relatively more, compared to a remaining portion of the gasket 230 at an inner outer peripheral portion of the gasket 230 facing an upper surface of the cap assembly 220.

The protruding portion 231 of the gasket 230 has a portion having a flat structure and faces the upper surface of the cap assembly 220 to increase a contact area between the protruding portion 231 and the upper surface of the cap assembly 220.

A lower surface of a primary crimping mold 240, which faces an open upper end portion 211 of the metal can 210, includes an inclination portion 241 and an inclination blocking portion 242.

Accordingly, when the primary crimping mold 240 moves downward and applies a primary pressure, the open upper end portion 211 of the metal can 210 and an end portion 232 of the gasket 230 corresponding thereto form an inclination inclined toward a central axis A of the metal can 210.

After the primary pressure is applied, the primary crimping mold 240 is moved upward to be removed, and thereafter, a secondary crimping mold 250 applies a secondary pressure to the open upper end portion 211 of the metal can 210 having the inclination formed therein to form a crimping portion 201.

The secondary crimping mold 250 includes a flat portion 251, an outer periphery supporting portion 252, a connection portion 253, and an inclination forming portion 254.

The flat portion 251 is formed in a flat structure on a lower surface of the secondary crimping mold 250 facing the open upper end portion 211 to form a flat section 213 parallel to a lower surface of the metal can 210 in the crimping portion 201.

The outer periphery supporting portion 252 is perpendicular to the flat portion 251 and faces a crimped outer periphery of the open upper portion of the metal can 210.

The connection portion 253 has a streamlined structure on a vertical section to connect the flat portion 251 is to the outer periphery supporting portion 252.

Accordingly, the open upper end portion 211 of the metal can 210, which is inclined by the primary crimping mold 240, is further bent along the connection portion 253 of the secondary crimping mold 250, and the flat section 213 is formed by the flat portion 251 of the secondary crimping mold 250.

The inclination forming portion 254 is formed at one side end portion of the flat portion 251 facing the outer periphery supporting portion 252 on the vertical section and is bent and extended from an end portion of the flat portion 251 to the lower surface direction of the metal can 210.

Accordingly, the open upper end portion 211 of the metal can 210 is further bent in a direction of the lower surface of the metal can 210, so that the end portion 232 of the gasket 230, which protrudes relatively further than the open upper end portion 211, is formed to have a structure that surrounds the open upper end portion 211.

Hereinafter, the present disclosure will be described in detail with reference to examples of the present disclosure, but the scope of the present disclosure is not limited thereto.

Example 1

Figure 2:
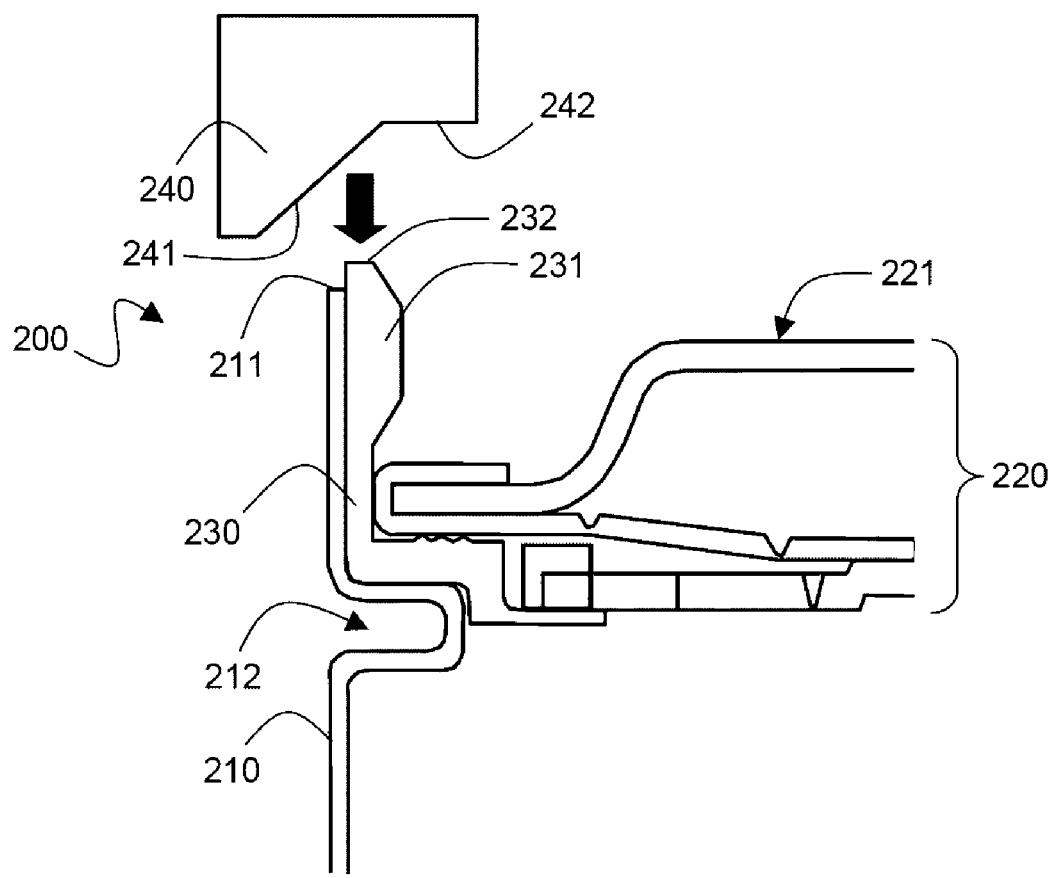
FIGS. 2 to 5 are schematic views showing a process of forming a crimping portion using a cylinder type battery cell manufacturing apparatus according to one embodiment of the present disclosure.
Figure 3:
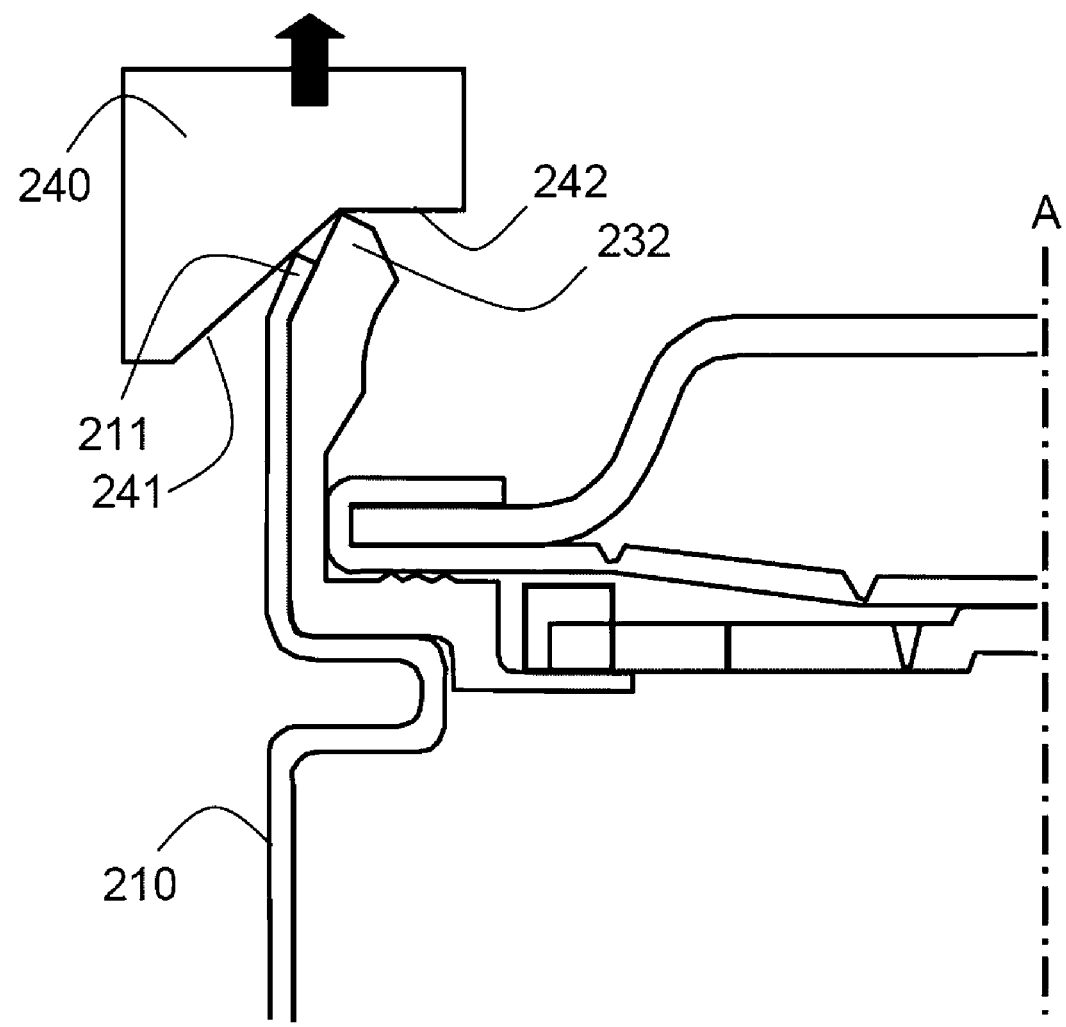
Figure 4:
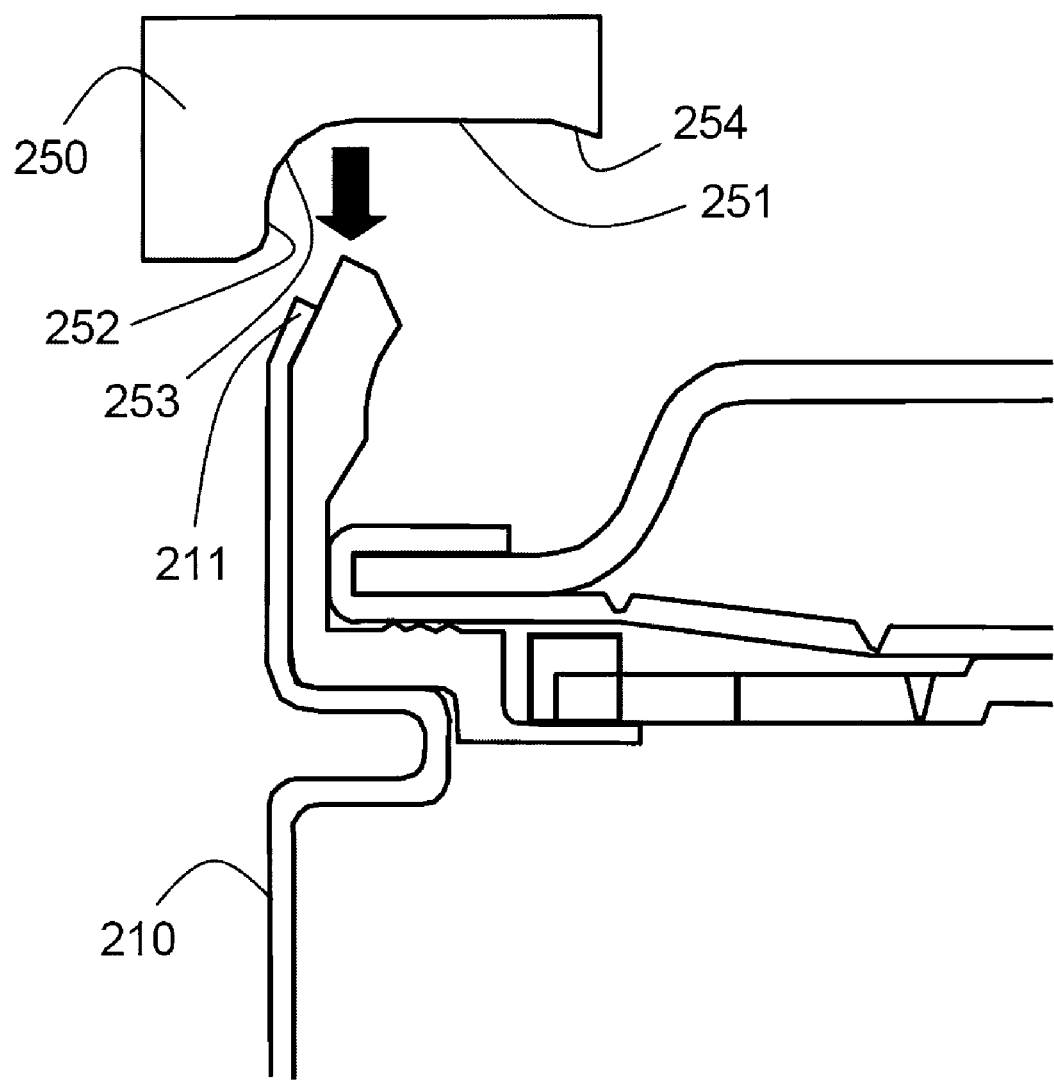
Figure 5:
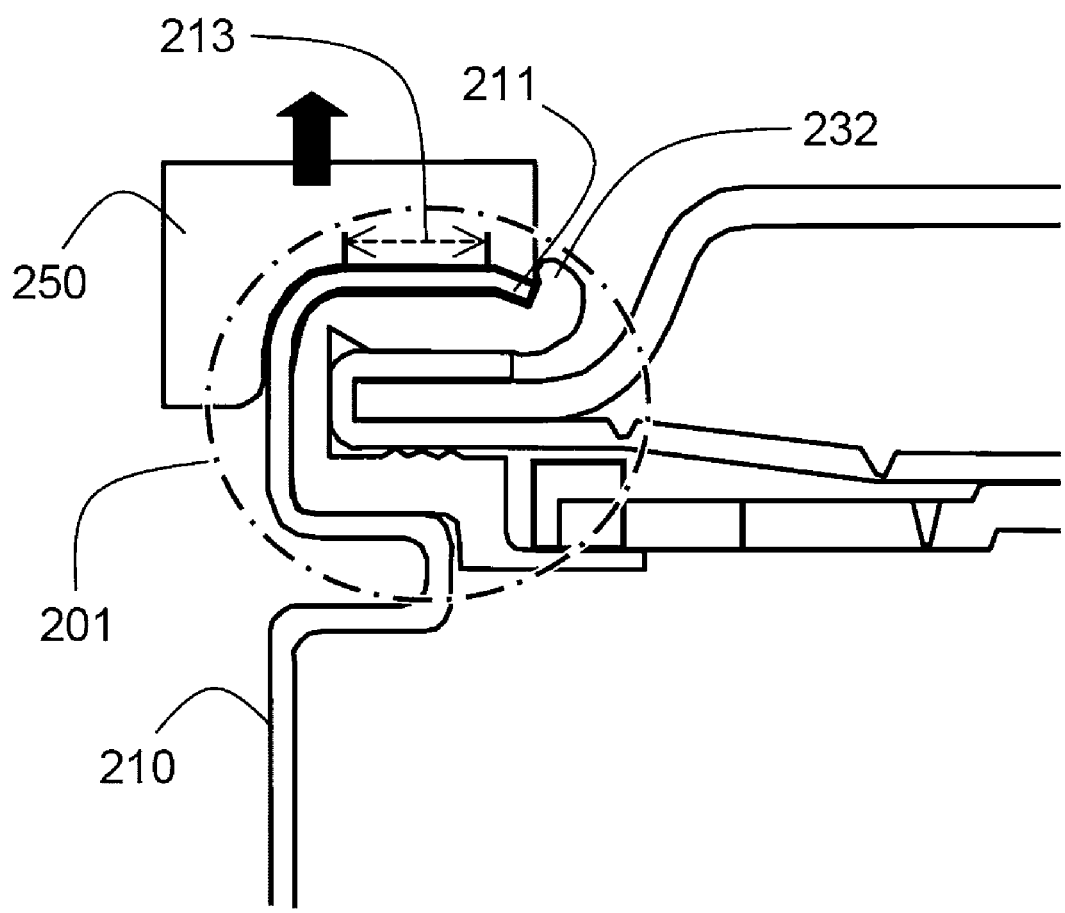

A beading portion was formed at a portion spaced apart by 4.3 mm from an open upper end portion of a cylinder type metal can having an open upper portion in a state in which an electrode assembly and an electrolyte were housed in the metal can, a primary pressure was applied to the open upper end portion using the primary crimping mold of FIG. 2 in a state in which a cap assembly was seated, and the open upper end portion was bent to have an inclined structure so that a height from the beading portion to the open upper end portion was 3.7 mm. Thereafter, a secondary pressure was applied to the bent open upper end portion by using the secondary crimping mold of FIG. 4 to manufacture a cylinder type battery cell having a crimping portion having a height of 2.55 mm from the beading portion to the open upper end portion, which is about 70% of the height when the primary pressure is applied.

Comparative Example 1

The same cylinder type battery cell as that of Example 1 was manufactured, except that a crimping portion was formed by applying the primary pressure and the secondary pressure to the open upper end portion by using the primary crimping mold having the lower surface which faces the open upper end portion of the metal can and has the streamlined structure.

Experimental Example 1

A length of the flat section formed by bending the open upper end portion of the metal can in the crimping portion of the cylinder type battery cell manufactured in Example 1 and Comparative Example 1 was measured and the results are shown in Table 1 below.

TABLE 1

|  | Length of Flat Section (mm) |
| --- | --- |
| Example 1 | 1.3 |
| Comparative Example 1 | 0.6 |

Referring to Table 1, it can be seen that the length of the flat section in Example 1 manufactured using the secondary crimping mold is greater than that in Comparative Example 1 manufactured using only the primary crimping mold.

This indicates that a flat section having a longer length is formed in the process of forming the crimping portion by applying the secondary pressure to the open upper end portion of the metal can by the flat portion of the secondary crimping mold, to provide a wider welding area when the cylinder type battery cell is electrically connected to a substrate having a plate type structure such as a rigid flex substrate, and thus a welding process for the electrical connection may be performed more easily, and as the welding area is increased, a better bonding force may be exhibited and structural stability may be improved.

Although the present disclosure has been described with reference to the accompanying drawings and embodiments thereof, it should be understood by those skilled in the art that various changes may be made without departing from the spirit and scope of the present disclosure.

The invention claimed is:

1. A cylinder type battery cell manufacturing apparatus which is an apparatus configured to form a crimping portion on a cap assembly coupling portion of a cylinder type battery cell, comprising:
   a primary crimping mold configured to apply a primary pressure so that a vertical section of an open upper end portion of a cylinder type metal can forms an inclination inclined towards a central axis of the metal can in a state in which a cap assembly is coupled to the open upper portion of the cylinder type metal can; and
   a secondary crimping mold configured to apply a secondary pressure to the open upper end portion in which the inclination is formed so that a flat section parallel to a lower surface of the metal can is formed in the crimping portion,
   wherein the secondary crimping mold has a flat portion corresponding to the flat section formed on a lower surface of the secondary crimping mold facing the open upper end portion of the metal can to form the flat section in the crimping portion, and the lower surface of the secondary crimping mold also having an inclination forming portion positioned radially inwardly towards the central axis from the flat portion.

2. The apparatus of claim 1, wherein the primary crimping mold comprises:
   an inclination portion having an inclined structure in which a lower surface of the primary crimping mold, which faces the open upper end portion of the metal can, is inclined relative to the central axis of the metal can so that the vertical section of the open upper end portion of the metal can forms the inclination inclined towards the central axis of the metal can; and
   an inclination blocking portion connected to the inclination portion, and having a structure parallel to the lower surface of the metal can to prevent the open upper end portion from being bent.

3. The apparatus of claim 1, wherein the secondary crimping mold further comprises:
   an outer periphery supporting portion perpendicular to the flat portion and facing a crimped outer periphery of the cap assembly coupling portion; and
   a connection portion having a streamlined structure on a vertical section of the secondary crimping mold to connect the flat portion to the outer periphery supporting portion.

4. The apparatus of claim 3, wherein the secondary crimping mold forms the crimping portion in a state in which the outer periphery supporting portion stably supports the outer periphery of the cap assembly coupling portion, and the open upper end portion of the metal can may be more easily bent to an angle parallel to the lower surface of the metal can along the connection portion in a state in which the open upper end portion of the metal can faces the connection portion having the streamlined structure on the vertical section.

5. The apparatus of claim 1, wherein the secondary pressure applied by the secondary crimping mold is 101% to 300% of the primary pressure applied by the primary crimping mold.

6. A method of forming a crimping portion on a cap assembly coupling portion of a cylinder type battery cell, the method comprising:
   (a) forming an inwardly indented beading portion in an open upper portion of a cylinder type metal can;
   (b) seating the cap assembly in the open upper portion of the metal can;
   (c) applying a primary pressure by a primary crimping mold onto the cap assembly such that a vertical section of an open upper end portion of the metal can forms an inclination inclined inwardly towards a central axis of the metal can; and
   (d) applying a secondary pressure to the open upper end portion in which the inclination is formed by a secondary crimping mold so that a flat section parallel to a lower surface of the metal can is formed in the crimping portion, the secondary crimping mold having a flat portion formed on a lower surface of the secondary crimping mold facing the open upper end portion to form the flat section in the crimping portion, the lower surface of the secondary crimping mold also having an inclination forming portion positioned radially inwardly towards the central axis from the flat portion.

7. The method of claim 6, wherein the inclination at which the open upper end portion is inclined by the primary crimping mold has an angle of 10 to 80 degrees with respect to the central axis of the metal can.

8. The method of claim 6, wherein a length of the flat section of the crimping portion formed by the flat portion of the secondary crimping mold have a size of 5% to 20% of a diameter of the metal can.

9. The method of claim 6, wherein the beading portion of process (a) is formed at a portion spaced apart from the open upper end portion of the metal can by 200% to 500% of a length of the flat section formed in the crimping portion.

10. The method of claim 6, wherein process (b) comprises seating the cap assembly in the open upper portion of the metal can in a state in which a gasket surrounding an outer periphery of the cap assembly is coupled to the cap assembly.

11. The method of claim 6, wherein the primary crimping mold comprises:
   an inclination portion having an inclined structure in which a lower surface of the primary crimping mold, which faces the open upper end portion of the metal can, is inclined relative to the central axis of the metal can so that the vertical section of the open upper end portion of the metal can forms the inclination inclined towards the central axis of the metal can; and
   an inclination blocking portion connected to the inclination portion and having a structure parallel to the lower surface of the metal can to prevent the open upper end portion from being bent.

12. The method of claim 6, wherein the secondary pressure applied by the secondary crimping mold in process (d) is in a range of 101% to 300% of the primary pressure applied by the primary crimping mold in process (c).

13. The method of claim 6, wherein the secondary crimping mold further comprises:
   an outer periphery supporting portion perpendicular to the flat portion and facing a crimped outer periphery of the cap assembly coupling portion; and
   a connection portion having a streamlined structure on a vertical section of the secondary crimping mold to connect the flat portion to the outer periphery supporting portion.

14. The method of claim 10,
   wherein the gasket comprises a protruding portion protruding farther than a remaining portion of the gasket excluding the protruding portion at a portion of the gasket facing an upper surface of the cap assembly; and
   the protruding portion has a portion having a flat structure and facing the upper surface of the cap assembly to increase a contact area between the protruding portion and the upper surface of the cap assembly.

15. The method of claim 14, wherein an end portion of the gasket in which the protruding portion is located protrudes further towards the central axis than the open upper end portion of the metal can.

16. The method of claim 15, wherein at least a part of the open upper end portion is wrapped by the end portion of the gasket which is relatively more protruding.

17. A method of forming a crimping portion on a cap assembly coupling portion, the method comprising:
   (a) forming an inwardly indented beading portion such that a cap assembly is seated in an open upper portion of a cylinder type metal can;
   (b) seating the cap assembly in the open upper portion of the metal can;
   (c) applying a primary pressure by a primary crimping mold located on the cap assembly such that an open upper end portion of the metal can forms an inclination inclined to a direction of a lower surface of the metal can on a vertical section, wherein the primary crimping mold comprises an inclination portion and an inclination blocking portion, the inclination portion having an inclined structure in which the lower surface of the primary crimping mold, which faces the open upper end portion of the metal can, is inclined on the vertical section to a central axis of the metal can so that the open upper end portion of the metal can forms the inclination inclined on the vertical section to the central axis of the metal can, and the inclination blocking portion connected to the inclination portion and having a structure parallel to the lower surface of the metal can to prevent the open upper end portion from being bent; and
   (d) applying a secondary pressure to the open upper end portion in which the inclination is formed by a secondary crimping mold so that a flat section parallel to the lower surface of the metal can is formed in the crimping portion.

* * * * *